United States Patent [19]
Brunner

[11] Patent Number: 5,363,583
[45] Date of Patent: Nov. 15, 1994

[54] TIP-UP FISHING APPARATUS

[76] Inventor: Phillip G. Brunner, 110 Young Dr., Concord, Mich. 49237

[21] Appl. No.: 140,508

[22] Filed: Oct. 25, 1993

[51] Int. Cl.⁵ ............................................. A01K 85/01
[52] U.S. Cl. .................................................... 43/17
[58] Field of Search ................................ 43/15, 16, 17

[56] References Cited

U.S. PATENT DOCUMENTS

| | | | |
|---|---|---|---|
| 2,502,231 | 3/1950 | Oberg | 43/17 |
| 2,575,156 | 11/1951 | Baugh et al. | 242/109 |
| 2,598,778 | 6/1952 | Fred | 43/17 |
| 2,651,875 | 9/1953 | Brockman | 43/17 |
| 2,693,046 | 11/1954 | Langevin | 43/17 |
| 2,759,287 | 8/1956 | Urban | 43/16 |
| 2,887,813 | 5/1959 | Gelinas | 43/17 |
| 2,936,541 | 5/1960 | Stanford | 43/17 |
| 2,977,704 | 4/1961 | Tinsley | 43/17 |
| 3,196,570 | 7/1965 | Borisch | 43/17 |
| 4,821,446 | 4/1989 | Beaulieu, Jr. | 43/17 |
| 4,907,363 | 3/1990 | Dury | 43/15 |
| 5,101,591 | 4/1992 | Frazier et al. | 43/17 |

*Primary Examiner*—P. Austin Bradley
*Assistant Examiner*—James Miner

[57] ABSTRACT

Ice fishing apparatus of the tip-up type wherein a fish line reel is supported below the water surface upon a column suspended from a cross bar resting upon the ice surface. The fishing reel is maintained in a ready position by an elastic band supported at one end relative to the column, and attached to a detent mounted on the reel. A fish on the line tends to unwind the reel tensioning the elastic band, and upon a pre-determined tension in the band being achieved the detent is released permitting the reel to deploy the line. The elastic band serves to set the hook. Preferably, the elastic band is anchored to a trigger attached to the column and operatively associated with a resiliently supported flag to indicate reel release. However, the flag indicator may be removed from the apparatus without affecting its fishing function.

9 Claims, 1 Drawing Sheet

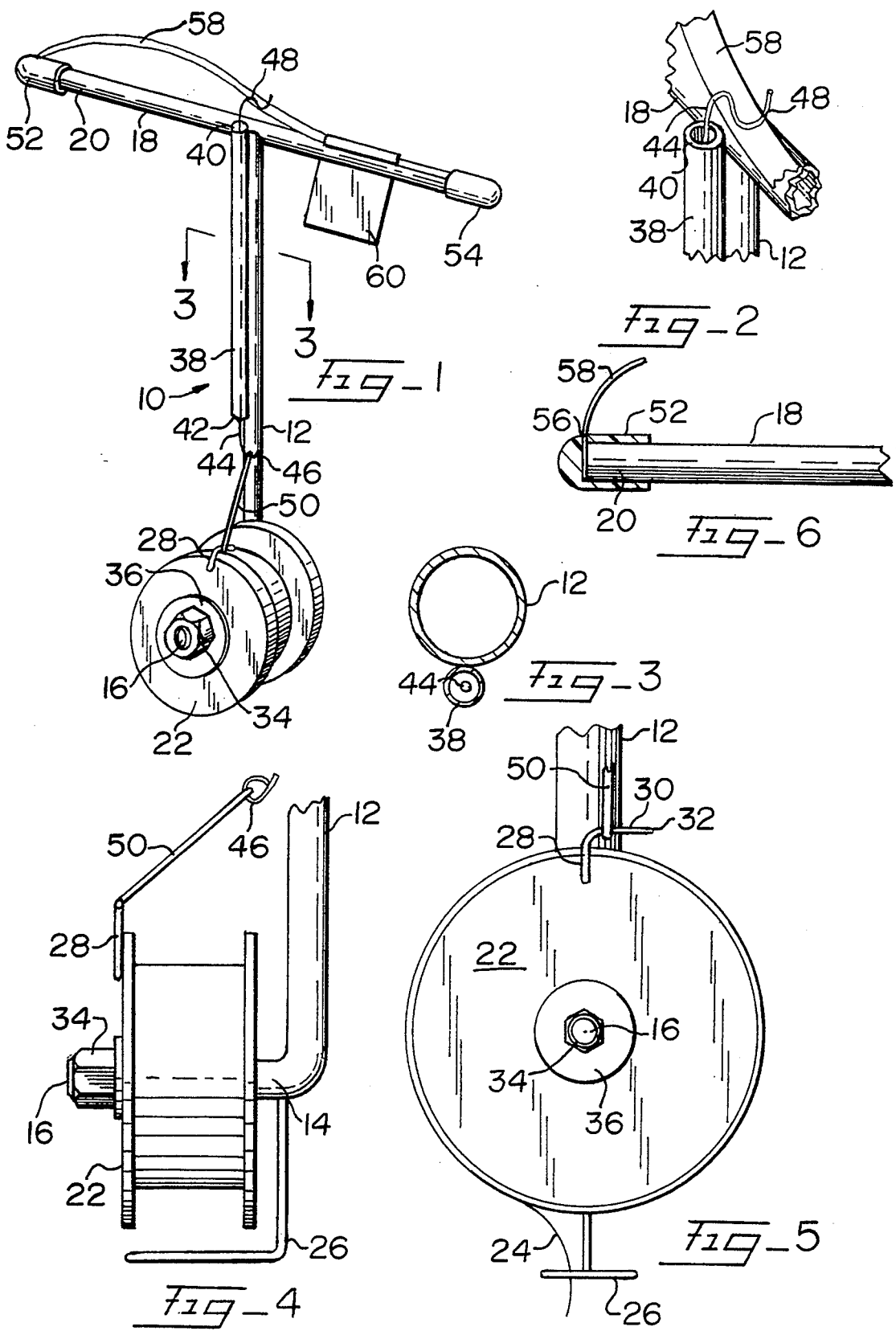

TIP-UP FISHING APPARATUS

BACKGROUND OF THE INVENTION

1. Field of the Invention

The invention pertains to tip-up fishing apparatus of the type used in ice fishing wherein the fishing line is wound upon a submerged reel suspended from a vertically disposed column, and the reel is controlled in such a manner as to aid the setting of the hook.

2. Description of the Related Art

Tip-up ice fishing apparatus using a submerged reel upon which the fishing line is wound has the advantage of preventing freezing of the reel and line. Such devices usually include a cross arm supporting the vertical column upon which the reel is mounted at the column lower end, and an indicator in the form of a flag is usually mounted upon the upper end of the column to indicate when the reel has been rotated due to tension forces applied to the fishing line by a hooked fish. Devices of this type are shown in U.S. Pat. Nos. 2,575,156; 2,598,778; 2,651,875; 2,693,046; 2,887,813; 4,821,446; 4,907,363 and 5,101,591.

While the aforementioned patents, and similar devices, do support the reel and fishing line below the water surface, and avoid freezing of the reel and line, known devices are complicated, undependable, and do not provide practical means for setting the hook in the fish's mouth upon the bait being taken. Tip-up fishing devices of the aforementioned type presently on the market are unduly expensive to manufacture, and they often lack dependability of operation.

Additionally, it is often desirable to permit ice fishing apparatus to remain in place for several days, and tip-up apparatus utilizing indicators mounted upon columns or other structure extending above the surface of the ice indicate the location of the fishing apparatus and subject the apparatus to vandalism.

OBJECTS OF THE INVENTION

It is an object of the invention to provide ice fishing apparatus using a submerged fishing line reel wherein the apparatus is dependable in operation, will not freeze up, and is economical to manufacture.

A further object of the invention is to provide ice fishing apparatus utilizing a submerged fishing line reel wherein the reel is retained against fish line deployment by an elastic element permitting the hook to be set, and requiring sufficient tension within the fish line to set the hook prior to the reel being released for full deployment.

An additional object of the invention is to provide ice fishing apparatus of the automatic setting type wherein a resiliently biased flag indicator may be optionally utilized, and if it is desired to avoid vandalism problems, the indicator may be removed from the apparatus without adversely affecting its operation.

Yet a further object of the invention is to provide ice fishing apparatus of the submerged fishing line reel type wherein a biased indicator may be used to indicate reel rotation upon a fish being hooked, and the trigger apparatus extending to the indicator is enclosed to prevent freezing of the operating components.

SUMMARY OF THE INVENTION

Tip-up fishing apparatus in accord with the invention includes a vertically disposed column having a cross arm at its upper end transversely disposed to the column so that the column will be suspended from the cross arm for extending through a hole formed in the ice. A rotatable fishing line reel is mounted at the column lower end, and the column is of sufficient length, or depth, to locate the fishing reel below the water level to avoid freezing.

A trigger guide tube is attached to the column substantially parallel thereto having open upper and lower ends, and a trigger wire is located within the guide tube having an upper end in the form of a hook, and the lower end defines a loop receiving an elastic element such as a rubber band.

A detent is mounted upon the fishing reel having a cantilevered portion extending in a tangential direction opposite to the direction of reel rotation when the fishing line is being deployed, such as upon a fish being hooked, and the elastic band is attached to the reel detent under tension.

The upper end of the trigger, i.e. the hook, normally engages a resiliently biased flag indicator to hold the flag indicator in a lowered position, and upon the reel detent being released the trigger permits the indicator to be released and the flag will be disposed vertically for ease of observation.

The use of the resilient band to retain the fishing reel against rotation permits a pre-determined tension to exist in the band prior to the band releasing the reel for fish line deployment, and the resilient nature of the band aids in setting the hook.

The flag indicator is in the form of a spring steel leaf having a flag at one end, and the other end of the spring leaf is attached to a removable cap located at an end of the cross arm. By removing spring leaf from the cross arm cap, the flag indicator is removed from the fishing apparatus and only the cross arm remains upon the surface of the ice and visible. In such instance, vandalism to the apparatus is reduced in that its location is not readily observable.

BRIEF DESCRIPTION OF THE DRAWINGS

The aforementioned objects and advantages of the invention will be appreciated from the following description and accompanying drawings wherein:

FIG. 1 is a perspective view of tip-up fishing apparatus in accord with the invention, the flag indicator being in the lowered cocked position, and prior to release of the fishing line reel, FIG. 2 is a detail enlarged perspective view of the upper end of the guide tube showing the relationship of the trigger hook and the flag indicator spring leaf, FIG. 3 is a plan sectional view taken along Section 3—3 of FIG. 1, FIG. 4 is an enlarged detail side elevational view of the lower end of the Column and the reel illustrating the elastic band in its connected relationship to the reel detent, the fishing line not being illustrated, FIG. 5 is a detail elevational view of the lower end of the fishing apparatus as taken from the left of FIG. 4, and FIG. 6 is an elevational detail view, partially sectioned, illustrating the mounting of the end cap and indicator spring leaf upon the cross arm end.

DESCRIPTION OF THE PREFERRED EMBODIMENT

With reference to FIG. 1, tip-up fishing apparatus in accord with the inventive concept is generally represented at 10. The apparatus includes a vertically disposed column 12 whose lower end is offset at 14 to define an axle having an axis perpendicularly disposed to the length of the column 12. The end of the axle 14 is threaded at 16 for receiving a nut, as later described.

At its upper end, the column 12 is provided with a cross arm 18 perpendicularly disposed to the length of the column, and the cross arm 18 includes ends 20.

A fishing line reel 22 is rotatably mounted upon the column axle 14 having fishing line 24 wound thereon in a counterclockwise direction as the reel is viewed in FIGS. 1 and 5. The fishing line 24 is not illustrated in FIGS. 1 and 4 in order to clarify the view of the reel structure. A fishing line guide 26 is attached to the column axle 14 and comprises an eyelet located below the reel 22 through which the line 24 is threaded, FIG. 5, and the lower end of the line 24 is provided with conventional fishing apparatus, not shown, such as weights, leaders, hooks, and the like.

The reel 22 is provided with a reel detent 28 radially spaced from the axis of rotation of the reel. As will be appreciated from FIGS. 1 and 5, the detent 28 is located adjacent the periphery of the reel and is in the form of a wire received within a hole in the reel, and the detent includes a portion 30 having a free end 32. As will be appreciated from FIGS. 1 and 5, the detent portion 30 is disposed substantially tangentially to the reel 22 and extends in the clockwise direction, such clockwise direction being opposite to the direction of reel rotation when the fishing line is being deployed due to a hooked fish tensioning the line 24.

A nut 34 is threaded upon the column axle threads 16 engaging washer 36, and in this manner the reel 22 is rotatably maintained upon the axle 14.

A tubular guide tube 38 is attached to the column 12 by welding, or the like, and the guide tube includes an open upper end 40 and an open lower end 42. An elongated trigger wire of a stiff character, such as of spring wire 44 is located within the guide tube 38 for both rotational and longitudinal displacement therein, within limits. The lower end of the trigger wire 44 is provided with an offset and a loop 46, FIG. 1, and the upper end of the trigger wire is formed with a hook configuration 48, best shown in FIG. 2.

An elastic element 50, such as a rubber band, is located within the trigger wire loop 46, and the elastic element 50 is tensioned to extend over the portion 30 of the reel detent 28. In such an arrangement the element 50 will be under tension pulling the trigger wire 44 downwardly within guide tube 38. However, the configuration of hook 48 prevents the trigger wire from moving downwardly a significant extent.

The cross arm 18 is provided with end caps 52 and 54 formed of a synthetic plastic material as to firmly slip over the ends of the cross arm. The end cap 52 is provided with a slit 56 in line with the end of cross arm end 20, and the spring steel leaf 58 of the indicator is inserted into the slit 56 for attaching the indicator to the cross arm end. A flag 60 is mounted upon the free end of the spring steel leaf, and is usually of a bright color to improve visibility.

To use the tip-up fishing apparatus 10, the elastic band element 50 will not initially be placed upon the reel detent 28 as the fisherman will want to locate the bait at the desired depth and will deploy the fishing line 24 as desired so that the bait will be held at the proper depth. Either live passive bait, live active bait or artificial lures may be used with the apparatus. Once the desired fishing depth has been achieved by unreeling the line 24 from reel 22, the band 50 will be placed under tension upon the detent portion 30 as shown in FIGS. 1 and 5. The fact that the band 50 is under tension and is frictionally engaging the detent portion 30 will prevent the reel 22 from unreeling even under the weight of the line and bait.

The elastic nature of the band 50 will pull the trigger wire 44 downwardly engaging the hook 48 with the guide tube upper end 40. The engagement of the hook 48 with the guide tube end 40 restrains the trigger wire from excessive downward movement.

If the flag indicator consisting of the spring steel leaf 58 and flag 60 is to be used, the leaf 58 will be bent downwardly as shown in FIGS. 1 and 2 to lie adjacent the cross arm 18, and the hook 48 will be disposed above the spring steel leaf 58 partially locating leaf 58 within the configuration of the hook and maintaining the indicator in the lowered position of FIG. 1. The offset of the hook 48, and the configuration and orientation of the offset loop 46 to the hook 48 is such that with the band 50 under tension the hook 48 will be maintained in a superimposed position over the spring steel leaf 58 to effectively hold the flag indicator in its lowered position. However, the upward biasing force of the leaf spring 58 on the hook 48 is of such character, and the hook 48 is of such configuration, that the hook 48 will be pushed aside permitting the leaf spring 58 to assume its normal vertical raised position making the flag 60 visible from a distance if there is no resistance to rotation of the trigger wire 44. However, due to the tensioning force produced by the band 50 the hook 48 will be superimposed over the spring steel leaf 58 as shown in FIG. 2 prior to the hooking of a fish and the band 50 will prevent rotation of the hook under the biasing force of the leaf 58.

A fish nibbling upon the bait and producing small tensions or pulls on the line 24 will tend to rotate the reel 22 in a clockwise direction, FIG. 5. The resilient nature of the band 50 will permit such nibbling of the bait without releasing the flag indicator. However, upon the fish firmly biting upon the bait and tensioning the line 24, an extensive counterclockwise rotation of the reel 22 will occur though resisted by the increasing tension produced in the band 50 and the frictional engagement of the band 50 upon the detent portion 30 is sufficient to set the hook in most cases. Continued tensioning of the fish line by the hooked fish will produce sufficient counterclockwise rotation of the reel 22 to permit the band 50 to slide from the detent portion 30 over the detent end 32 releasing the band and trigger wire 44 from the reel.

Once the band 50 is no longer tensioned, the biasing force imposed upon the hook 48 by the spring steel leaf 58 will push the hook aside permitting the spring steel leaf 58 to spring upwardly to its elevated position making the flag 60 observable, and the fisherman may then attend to the hooked fish, pulling the apparatus 10 from the hole in the ice and retrieving the fish.

The guide tube 38 is so positioned upon the column 12, and is of such length, that the guide tube extends through the surface of the water and as the reel 22 will be located below the water surface freezing of the reel and the trigger mechanism will not occur. The cross arm 18 will be resting upon the ice surface extending across the hole cut in the ice through which the column 12 and reel 22 is inserted and the construction of the apparatus permits dependable operation and prevents the moving components from freezing solid.

If it is desired to use the fishing apparatus without the flag indicator, the spring leaf 58 may be easily withdrawn from the cap end slit 56 and the flag indicator removed from the apparatus. The fishing apparatus will operate as described above except that upon the hooking of a fish there will be no visual indication of such occurrence. By removing the flag indicator, spring steel leaf 58 and flag 60, the location of the fishing apparatus 10 will not be readily discernible minimizing vandalism in those instances where the tip-up apparatus may be left in a given location for extended lengths of time.

It is appreciated that various modifications to the inventive concepts may be apparent to those skilled in the art without departing from the spirit and scope of the invention.

I claim:

1. Fishing apparatus comprising, in combination, a column having upper and lower ends, a fishing line reel rotatably mounted on said column lower end having fishing line wound thereon and having an axis of rotation, a reel detent member mounted on said reel at a location radially spaced from said axis of rotation, an anchor member supported by said column in proximity to said reel, an elastic element under tension interconnecting said reel detent and anchor member preventing rotation of said reel in a fishing line deploying direction until an elastic element pre-determined tension is achieved, said element releasing from one of said members upon pre-determined tension being reached to permit rotation of said reel and deploying of said fishing line therefrom, and an elongated column support cross arm affixed to said column upper end having a length transversely disposed to the length of said column for supporting said column.

2. In fishing apparatus as in claim 1, said elastic element comprising a rubber band.

3. In fishing apparatus as in claim 1, said reel detent comprising a shaped cantilevered projection mounted on said reel having an end portion substantially tangentially oriented to the direction of reel rotation and including a free terminating end, said elastic element being mounted on said end portion and adapted to slip from said end portion off of said terminating end upon said pre-determined tension being reached to permit rotation of said reel and deploying of said fishing line.

4. In fishing apparatus as in claim 3, said reel detent projection terminating end extending in the reel tangential direction opposite to the direction of reel rotation during fishing line deployment.

5. In fishing apparatus as in claim 1, a resiliently biased indicator mounted upon said cross arm biased toward a raised position and deflectable to a lowered cocked position, a trigger mounted on said column adapted to engage said indicator and maintain said indicator in said cocked position, said anchor member being formed on said trigger whereby release of said reel detent and reel permits said trigger to release said indicator to permit said indicator to be biased to said raised position.

6. In fishing apparatus as in claim 5, said trigger comprising an elongated member mounted on said column for longitudinal and rotational movement therein having a upper end and a lower end, said trigger upper end including releasable indicator engaging means and said trigger lower end constituting said anchor member, said elastic element being mounted upon said trigger lower end.

7. In fishing apparatus as in claim 6, said trigger indicator engaging means comprising a hook.

8. In fishing apparatus as in claim 6, a guide tube mounted on said column substantially parallel thereto having open ends, said trigger comprising a wire member within said guide tube having upper and lower ends extending from said guide tube.

9. In fishing apparatus as in claim 1, said cross arm having an end, a removable cap mounted upon said cross arm end, a resilient indicator mounted upon said cap, and a trigger interposed between said indicator and anchor supporting said anchor, said trigger engaging and maintaining said indicator in a lowered position until said elastic element pre-determined tension is achieved and releasing said indicator to permit said indicator to bias to an elevated position upon rotation of said reel to deploy said fishing line.

* * * * *